United States Patent
Ilg et al.

(10) Patent No.: US 6,867,266 B2
(45) Date of Patent: Mar. 15, 2005

(54) LIGHT-STABILIZED POLYMERIC ARTICLES AND METHODS OF MAKING THE SAME

(75) Inventors: Otto Ilg, Asheville, NC (US); Harry Hu, Greenville, SC (US)

(73) Assignee: BASF Corporation, Florham Park, NJ (US)

( * ) Notice: Subject to any disclaimer, the term of this patent is extended or adjusted under 35 U.S.C. 154(b) by 178 days.

(21) Appl. No.: 10/162,007

(22) Filed: Jun. 4, 2002

(65) Prior Publication Data

US 2003/0027978 A1 Feb. 6, 2003

Related U.S. Application Data

(60) Provisional application No. 60/298,217, filed on Jun. 14, 2001.

(51) Int. Cl.⁷ .............................................. C08L 77/06
(52) U.S. Cl. ..................... 525/420; 525/437; 525/453
(58) Field of Search ................ 525/437, 453, 525/420; 528/326

(56) References Cited

U.S. PATENT DOCUMENTS

| | | |
|---|---|---|
| 3,287,324 A | 11/1966 | Sweeny |
| 3,437,641 A | 4/1969 | Lenz et al. |
| 3,671,542 A | 6/1972 | Kwolek |
| 3,819,573 A | 6/1974 | Ackermann et al. |
| 4,232,131 A | 11/1980 | Rody et al. |
| 4,395,508 A * | 7/1983 | Nelli et al. .................. 524/103 |
| 4,469,829 A * | 9/1984 | Konietzny et al. .......... 524/103 |
| 4,522,774 A | 6/1985 | Donnelly et al. |
| 5,132,391 A | 7/1992 | White et al. |
| 5,618,909 A * | 4/1997 | Lofquist et al. ............. 528/310 |
| 5,851,238 A | 12/1998 | Gadoury et al. |
| 6,136,433 A * | 10/2000 | McIntosh et al. ........... 428/364 |
| 6,150,496 A * | 11/2000 | Ilg et al. ...................... 528/332 |
| 6,218,452 B1 | 4/2001 | Kaul et al. |
| 6,423,817 B1 * | 7/2002 | Weinerth et al. ............. 528/310 |
| 6,441,088 B1 * | 8/2002 | Kaul et al. ................... 524/718 |
| 6,495,660 B2 * | 12/2002 | Long ........................... 528/480 |
| 6,620,208 B2 * | 9/2003 | Breiner et al. .............. 8/115.54 |

FOREIGN PATENT DOCUMENTS

| | | |
|---|---|---|
| GB | 992736 | 5/1965 |
| GB | 1202698 | 8/1970 |
| WO | WO 91/03511 | 3/1991 |
| WO | WO 98/50610 | 11/1998 |

* cited by examiner

*Primary Examiner*—Margaret G. Moore
(74) *Attorney, Agent, or Firm*—Fernando A. Borrego; Howard & Howard Attys

(57) ABSTRACT

A method of making thermoformable articles is disclosed. The method includes mixing one or more light-stabilized polymers having a high concentration of light-stabilizing moieties covalently bonded along the polymer chain with one or more additional polymeric materials, which are substantially free from light-stabilizing moieties.

14 Claims, No Drawings

LIGHT-STABILIZED POLYMERIC ARTICLES AND METHODS OF MAKING THE SAME

TECHNICAL FIELD OF THE INVENTION

The present invention is directed to light-stabilized polymers and articles made therefrom. The present invention is also directed to a method of making light-stabilized polymers and articles containing the same.

BACKGROUND OF THE INVENTION

Much effort has been directed at improving the light stability of polymers, such as polyamides. One method of improving the light stability of polymers is to incorporate one or more components into the polymer structure, wherein the one or more components comprise a light-stabilizing moiety. When present in the polymer chain of the resulting polymer, the light-stabilizing moiety provides enhanced light stability to the polymer. For example, nylon and nylon fibers formed by the polymerization of caprolactam in the presence of a hindered piperidine compound such as 4-amino-2,2,6,6-tetramethylpiperidine (TAD) exhibit improved light stability due to the light-stabilizing TAD moiety as taught in U.S. Pat. Nos. 5,851,238; 6,136,433; and 6,150,496, all of which are assigned to BASF Corporation, Mt. Olive, N.J., the entirety of all of which is incorporated herein by reference.

In the above-mentioned BASF patents, the concentration of TAD moieties along a light-stabilized polymer chain is less than 2 weight percent. In most cases, light-stabilizing properties are obtained when the TAD concentration is less than about 0.5 weight percent, based on the weight of the polymer-forming monomers.

In some countries around the world, for example China, the capacity for manufacturing light-stabilized polymers containing hindered amine compounds, such as TAD, is limited or does not exist at all. Because of the tight supply of light-stabilized polymer in the world market, only a limited amount of light-stabilized polymer can be sold to these countries.

Further, the manufacturing capacity for producing light-stabilized polymers in the form of films and/or fibers is limited. Typically, when a manufacturing facility is set up to produce a particular light-stabilized polymer film or fiber, the facility produces the particular light-stabilized polymer film or fiber in great quantity to optimize manufacturing efficiency, and to minimize downtime resulting from changes in product line. Any way to improve manufacturing capacity and/or flexibility would benefit the film and fiber industry.

What is needed in the art is a method of making light-stabilized polymers and light-stabilized article such that manufacturing capacity and/or flexibility is improved.

SUMMARY OF THE INVENTION

The present invention addresses some of the difficulties and problems discussed above by the discovery of a method of making light-stabilized polymers and light-stabilized article, wherein the method improves manufacturing capacity and flexibility. The method comprises forming a "stock material" in the form of a light-stabilized polymer having a high concentration of light-stabilizing moieties covalently bonded along the polymer chain. The stock material (i.e., the light-stabilized polymer having a high concentration of light-stabilizing moieties covalently bonded along the polymer chain) may be used as is, or may be further processed with one or more additional polymeric materials to form a thermoformable article, such as a film or fiber. The method of the present invention produces a single stock material, which may be used as is or with additional materials, improving manufacturing capacity and flexibility.

Accordingly, the present invention is directed to light-stabilized polymers having a high concentration of light-stabilizing moieties covalently bonded along the polymer chain.

The present invention is also directed to a method of making light-stabilized polymers having a high concentration of light-stabilizing moieties covalently bonded along the polymer chain.

The present invention is also directed to a method of making thermoformable articles, wherein the method comprises forming one or more light-stabilized polymers having a high concentration of light-stabilizing moieties covalently bonded along the polymer chain, and blending the one or more light-stabilized polymers having a high concentration of light-stabilizing moieties covalently bonded along the polymer chain with one or more additional polymeric materials to form a polymer blend, wherein the one or more additional polymeric materials are substantially free from light-stabilizing moieties.

The present invention is further directed to a method of doing business, wherein the method comprises the step of offering for sale a light-stabilized polymer having a high concentration of light-stabilizing moieties covalently bonded along the polymer chain. The method of doing business may further comprise mixing the light-stabilized polymer having a high concentration of light-stabilizing moieties covalently bonded along the polymer chain with one or more additional polymeric materials, wherein the one or more additional polymeric materials are free from light-stabilizing moieties.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the invention discussed are contemplated as would normally occur to one ordinarily skilled in the art to which the invention pertains.

One aspect of the present invention is directed to light-stabilized polymers having a high concentration of light-stabilizing moieties covalently bonded along the polymer chain. As used herein, the term "high concentration" refers to a concentration of greater than about 2 weight percent of one or more light-stabilizing moieties covalently bonded along the polymer chain, based on the total weight of the polymer forming monomers and the light-stabilizing moiety-containing compounds. Desirably, the light-stabilized polymers comprise from about 2.5 to about 15 weight percent of one or more light-stabilizing moieties covalently bonded along the polymer chain, based on the total weight of the polymer forming monomers and the light-stabilizing moiety-containing compounds. More desirably, the light-stabilized polymers comprise from about 3 to about 10 weight percent of one or more light-stabilizing moieties covalently bonded along the polymer chain, based on the total weight of the polymer forming monomers and the light-stabilizing moiety-containing compounds. Even more desirably, the light-stabilized polymers comprise from about 5 to about 10 weight percent of one or more light-stabilizing moieties covalently bonded along the polymer chain, based on the total weight of the polymer forming monomers and the light-stabilizing moiety-containing compounds.

The light-stabilized polymers of the present invention may be formed from a variety of monomers and light-stabilizing moieties. Suitable monomers for use in the present invention include, but are not limited to, polyamide-forming monomers such as diamine compounds, dicarboxylic acids, dicarboxylic acid diamine salts, caprolactam monomers, and combinations thereof; polyester-forming monomers; polyurethane-forming monomers; and polyimide-forming monomers.

In one embodiment of the present invention, the light-stabilized polymers are formed from polyamide-forming monomers. The light-stabilized polyamides may be formed from caprolactam monomers, at least one diamine compound, at least one dicarboxylic acid, at least one dicarboxylic acid diamine salt, and combinations thereof. Desirably, the light-stabilized polyamides are formed from caprolactam monomers; at least one diamine compound selected from hexamethylenediamine and tetramethylenediamine; at least one dicarboxylic acid selected from adipic acid, sebacic acid, and terephthalic acid; and combinations thereof. More desirably, the light-stabilized polyamides are formed from caprolactam monomers; at least one dicarboxylic acid selected from adipic acid and terephthalic acid; and combinations thereof.

In a further embodiment of the present invention, the light-stabilized polymers comprise one of the following polyamides having a high concentration of light-stabilizing moieties covalently bonded along the polymer chain: nylon 6, nylon 6/6, nylon 4/6, nylon 6/10, or aromatic nylons such as, poly(meta-phenylene isophthalamide) and poly(para-phenylene terephthalamide). Suitable polyamides include, but are not limited to, polyamides disclosed in U.S. Pat. No. 3,287,324 to Sweeny and U.S. Pat. No. 3,671,542 to Kwoleck, both of which are incorporated herein by reference, as well as, polyamides disclosed in U.S. Pat. Nos. 5,851,238; 6,136,433; and 6,150,496, all of which are assigned to BASF Corporation, Mt. Olive, N.J., and all of which are incorporated herein by reference.

One or more light-stabilizing moieties may be covalently bonded to the polymers described above. Suitable light-stabilizing moieties for use in the present invention include, but are not limited to, hindered amines, hindered phosphites, hindered phosphonites, and hindered phenols, and a combination thereof. Suitable hindered amines for use in the present invention include, but are not limited to, amines having a chemical structure as shown in Formula I below:

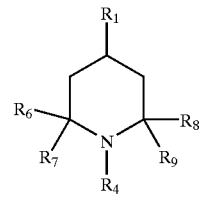

wherein $R_1$ represents $—NR_2R_3$;

$R_2$ and $R_3$ each independently represent hydrogen or an alkyl group containing from 1 to 7 carbon atoms;

$R_4$ represents hydrogen, benzyl, an alkyl group containing from 1 to 20 carbon atoms, or $—OR_5$;

$R_5$ represents hydrogen or an alkyl group containing from 1 to 20 carbon atoms; and $R_6$, $R_7$, $R_8$ and $R_9$ each independently represent hydrogen or an alkyl group containing from 1 to 7 carbon atoms. Other suitable hindered amines include, but are not limited to, aromatic hindered amines sold under the trade designations NYLOSTAB™ S-EED from Clariant Corporation (Charlotte, N.C.); and TINUVIN® 765, TINUVIN® 770, and TINUVIN® 622 available from Ciba Specialty Chemicals Corporation (Tarrytown, N.Y.).

Suitable hindered phosphites and phosphonites for use in the present invention include, but are not limited to, hindered phosphites and hindered phosphonites sold under the trade designations IRGAFOS® 168, IRGAFOS® TNPP, and IRGAFOS® P-EPQ, all of which are available from Ciba Specialty Chemicals Corporation (Tarrytown, N.Y.).

Suitable hindered phenols for use in the present invention include, but are not limited to, hindered phenols sold under the trade designations IRGANOX® 245, IRGANOX® 1098, IRGANOX® 259, IRGANOX® 1135, IRGANOX® 1010, IRGANOX® 1222, IRGANOX® 1076, IRGANOX® 1330, IRGANOX® 1425, and IRGANOX® MD1024, all of which are available from Ciba Specialty Chemicals Corporation (Tarrytown, N.Y.).

Suitable blends, such as blends of hindered phenols and phosphites, for use in the present invention include, but are not limited to, compositions sold under the trade designations IRGANOX® B215, IRGANOX® B225, IRGANOX® B561, IRGANOX® B900, and IRGANOX® B1171, all of which are available from Ciba Specialty Chemicals Corporation (Tarrytown, N.Y.).

Desirably, the one or more light-stabilizing compounds comprise hindered amines having a chemical structure as shown in Formula 1 above. More desirably, the one or more light-stabilizing compounds comprise hindered amines having a chemical structure as shown in Formula 1 above wherein $R_1$ represents $—NR_2R_3$; $R_2$ and $R_3$ each independently represent hydrogen; $R_4$ represents hydrogen, benzyl, or an alkyl group containing from 1 to 7 carbon atoms; and $R_6$, $R_7$, $R_8$ and $R_9$ each independently represent hydrogen or an alkyl group containing from 1 to 7 carbon atoms. Even more desirably, the one or more light-stabilizing compounds comprise 4-amino-2,2,6,6-tetramethylpiperidine (TAD).

In one desired embodiment of the present invention, the light-stabilized polymers are formed from one or more polymer-forming monomers as described above and one or more light-stabilizing hindered amines having a chemical structure as shown in Formula I above. The resulting polymer comprises one or more moieties represented by Formula II below:

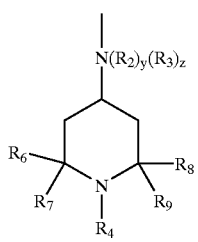

wherein $R_2$, $R_3$, $R_4$, $R_6$, $R_7$, $R_8$ and $R_9$ are as defined above; and y and z each independently represent 0 or 1 with the total of (y+z) being equal to 1.

More desirably, the light-stabilized polymers are formed from one or more polymer-forming monomers as described above and one or more light-stabilizing hindered amine moieties having a chemical structure as shown in Formula II wherein $R_2$ represents hydrogen; $R_4$ represents hydrogen, benzyl, or an alkyl group containing from 1 to 7 carbon atoms; $R_6$, $R_7$, $R_8$, and $R_9$ each independently represent hydrogen or an alkyl group containing from 1 to 7 carbon atoms; y is 1; and z is 0. Even more desirably, the light-stabilized polymers are formed from one or more polymer-forming monomers as described above and one or more light-stabilizing hindered amine moieties having a chemical structure as shown in Formula II wherein $R_2$ represents hydrogen; $R_4$ represents hydrogen, benzyl, or an alkyl group containing from 1 to 7 carbon atoms; $R_6$, $R_7$, $R_8$ and $R_9$ each represent a methyl group; y is 1; and z is 0.

In one desired embodiment of the present invention, the light-stabilized polymers are formed from one or more polyamide-forming monomers as described above and one or more light-stabilizing moieties covalently bonded to the resulting polyamide. Desirably, the light-stabilized polymers are formed from one or more caprolactam monomers, and 4-amino-2,2,6,6-tetramethylpiperidine (TAD). It has been determined that a desired composition for making light-stabilized polyamide comprises from about 2.5 to about 15 weight percent of 4-amino-2,2,6,6-tetramethylpiperidine (TAD) in caprolactam, based on the weight of caprolactam. More desirably, a composition for making light-stabilized polyamide comprises from about 3.0 to about 10.0 weight percent of 4-amino-2,2,6,6-tetramethylpiperidine (TAD) in caprolactam, based on the weight of caprolactam. Even more desirably, a composition for making light-stabilized polyamide comprises from about 5.0 to about 10.0 weight percent of 4-amino-2,2,6,6-tetramethylpiperidine (TAD) in caprolactam, based on the weight of caprolactam.

The present invention is also directed to a method of making light-stabilized polymers having a high concentration of light-stabilizing moieties covalently bonded along the polymer chain. One suitable polymerization process for making the light-stabilized polymers of the present invention is described in U.S. Pat. No. 5,149,758 to Matthies, the entirety of which is herein incorporated by reference, but with the addition of at least one or more light-stabilizing compounds in the polymerization mixture. The one or more light-stabilizing compounds and the polymer-forming monomers may be added separately or as a mixture to a reactor in which polymerization is effected.

In addition to the polymer-forming monomers and the one or more light-stabilizing compounds, the polymerization mixture may include other reaction components. Suitable reaction components include, but are not limited to, chain regulators, pigments, and initiators. In one embodiment of the present invention, the one or more polymer-forming monomers and the one or more light-stabilizing compounds are combined with an effective amount of at least one conventional chain regulator. The chain regulator(s) acts as a molecular weight controller.

The particular chain regulator, or combination of chain regulators, and the amount thereof are selected according to the desired molecular weight and melt stability of the final light-stabilized polymer. In the case of light-stabilized polyamides, at least one chain regulator is selected to produce a desired amino end group content of the final polyamide product and according to the desired melt stability of the final polyamide product. The desired amino end group content of the final polyamide product may also depend on the desired dyeability of the yarns or fibers produced from the polyamide product. The desired melt stability of the final polyamide product may further depend on the practical requirements for the processing of the polyamide, particularly for the spinning of the polyamide.

Suitable chain regulators for use in the present invention include, but are not limited to, monocarboxylic acids, dicarboxylic acids, amines, diamines, and combinations thereof. Suitable monocarboxylic acids include, but are not limited to, acetic acid, propionic acid, toluic acid, and benzoic acid. Suitable dicarboxylic acids include, but are not limited to, $C_4$–$C_{10}$ alkane dicarboxylic acids, particularly adipic acid, azelaic acid, sebacic acid, decanedicarboxylic acid, and dodecanedioic acid; $C_5$–$C_8$ cycloalkane dicarboxylic acids, particularly cyclohexane-1,4-dicarboxylic acid; and benzoic dicarboxylic acids, particularly isophthalic acid, terephthalic acid, and naphthalene-2,6-dicarboxylic acid. Suitable amines include, but are not limited to, hexylamine, cyclohexylamine, octylamine, benzylamine, and 2-phenylethylamine. Suitable diamines include, but are not limited to, $C_2$–$C_{18}$ alkane diamines, particularly tetramethylene diamine, hexamethylene diamine, and dodecane diamine; $C_5$–$C_8$ cycloalkane diamines; and $C_6$–$C_{24}$ aryl diamines, particularly para-phenylene diamine, meta-phenylene diamine, meta-xylylene diamine, and para-xylylene diamine. Desirably, the one or more chain regulators used in the present invention comprise one or more dicarboxylic acids or one or more diamines. The dicarboxylic acid or diamine chain regulators may be the same as or different from a dicarboxylic acid or diamine that is used as a polyamide-forming compound.

The one or more chain regulators may be used in an amount ranging from 0 to about 50 weight percent, based on the weight of the polymer-forming monomers. Desirably, the one or more chain regulators are used in an amount ranging from 0 to about 30 weight percent, based on the weight of the polymer-forming monomers. More desirably, the one or more chain regulators are used in an amount ranging from about 0.01 to about 2.0 weight percent, based on the weight of the polymer-forming monomers.

In one embodiment of the present invention, the method of making light-stabilized polymers comprises polymerization of polymer-forming monomers in the presence of one or more light-stabilizing compounds of Formula I and one or more pigments. Suitable pigments for use in the present invention include, but are not limited to, titanium dioxide and color-bearing compounds of organic or inorganic nature. The pigment(s) may be added to the polymer-forming monomers or to the polymerizing mixture in a desirable amount of up to about 5 weight percent, based on the weight of the polymer-forming monomers. More desirably, when present, one or more pigments are added to the polymerizing mixture in an amount ranging from about 0.01 to about 2.0 weight percent, based on the weight of the polymer-forming monomers.

The present invention is also directed to a method of making thermoformable articles, wherein the method comprises forming one or more light-stabilized polymers having a high concentration of light-stabilizing moieties covalently bonded along the polymer chain, and thermoforming the one or more light-stabilized polymers. Suitable thermoforming processes include, but are not limited to, extrusion processes, pultrusion processes, and batch molding processes. Any conventional thermoforming process and apparatus may be used to process the light-stabilized polymers of the present invention.

In one embodiment of the present invention, the method of making thermoformable articles comprises forming one or more light-stabilized polymers having a high concentration of light-stabilizing moieties covalently bonded along the polymer chain; mixing the one or more light-stabilized polymers with one or more additional polymeric materials to form a polymer mixture, wherein the one or more additional polymeric materials contain light-stabilizing moieties or are substantially free from light-stabilizing moieties; and thermoforming the polymer mixture to form a blended light-stabilized polymer. The resulting blended light-stabilized polymer contains a desired amount of one or more light-stabilizing moieties within the polymer blend.

Any thermoformable polymer may be used in combination with the one or more light-stabilized polymers having a high concentration of light-stabilizing moieties covalently bonded along the polymer chain. Suitable thermoformable polymers include, but are not limited to, polyamides, polyolefins, polyesters, polycaprolactone, ABS, and combinations thereof. The weight percent of each component in the polymer blend may vary depending upon the desired properties of the blended light-stabilized polymer. Typically, the polymer blend contains at least about 1.0 weight percent of one or more light-stabilized polymers having a high concentration of light-stabilizing moieties covalently bonded along the polymer chain, and up to about 99.5 weight percent of one or more additional polymers.

In an exemplary embodiment of the present invention, a method of making thermoformable articles in the form of a blended light-stabilized polymer comprises forming a light-stabilized polymer having from about 2.5 to about 15.0 weight percent of one or more light-stabilizing moieties covalently bonded along the polymer chain, wherein the weight of the one or more light-stabilizing moieties is based on the weight of the polymer-forming monomers; mixing the light-stabilized polymer with one or more additional polymers, which are substantially free of light-stabilizing moieties, to form a polymer blend; and co-extruding the polymer blend to form a light-stabilized polymer having a weight percent of one or more light-stabilizing moieties covalently bonded along a polymer chain of less than about 2.0 weight percent, based on the weight of the polymer blend. It should be noted that the above example may be used to produce a variety of polymer blends having a desired amount of light-stabilizing moieties within the blended polymer.

In one desired embodiment of the present invention, the method of making thermoformable articles in the form of a blended light-stabilized polymer comprises forming a light-stabilized polyamide having from greater than about 2.0 weight percent to about 10.0 weight percent of 4-amino-2,2,6,6-tetramethylpiperidine (TAD) covalently bonded along the polyamide chain, wherein the weight of TAD is based on the weight of the polyamide-forming monomers; mixing the light-stabilized polyamide with one or more additional polyamides, which are substantially free of light-stabilizing moieties, to form a polymer blend; and co-extruding the polymer blend to form a light-stabilized polyamide blend having a weight percent of 4-amino-2,2,6,6-tetramethylpiperidine (TAD) covalently bonded along a portion of the polyamide chains of from about 0.05 to about 2.0 weight percent, based on the weight of the polyamide blend. It should be noted that the choice of light-stabilizing compound, the starting weight percent of the light-stabilizing compound, and the final weight percent of the light-stabilizing moieties in the polymer blend of the above example may vary depending upon the desired properties of the resulting blended polymer. It should further be noted that the step of mixing may take place during a co-extrusion step, as opposed to mixing prior to an extrusion step.

The present invention is further directed to articles produced from the light-stabilized polymers and the blended light-stabilized polymers. Non-limiting examples of such articles include fibers, yarns, carpets, textile fabrics, films, foams, and multilayer articles containing one or more of the described articles. Fibers may be formed by subjecting the light-stabilized polymers of the present invention to any conventional fiber-forming process such as, for example, that disclosed in U.S. Pat. No. 4,983,448 to Karageorgiou and U.S. Pat. No. 5,487,860 to Kent et al., the entirety of both of which are incorporated herein by reference. One desired fiber-forming process involves rapidly spinning the light-stabilized polymers of the present invention at take-off speeds of at least about 4,000 m/min. Similarly, fabrics may be formed by subjecting the light-stabilized polymers of the present invention to any conventional fabric-forming process such as, for example, that disclosed in U.S. Pat. No. 4,918,947 to Speich, the entirety of which is incorporated herein by reference.

In one embodiment of the present invention, the articles formed from the above-described light-stabilized polymers are dyed. When the light-stabilized polymer of the present invention is a light-stabilized polyamide, the light-stabilized polyamide may be dyed with conventional dyes used to dye nylons such as, for example, metalized and non-metalized acid dyes. Usual dyebath conditions for dyeing nylon may be employed. In one exemplary embodiment, a dyebath is prepared at a volume equal to about 20 times the weight of the articles to be dyed. Processing chemicals are added, which include a chelating agent to prevent the deposition or complexing of metal ions in hard water, a dye leveling agent, and, in the case of metalized acid dyes, an acid donor to slowly lower the dyebath pH. The dyestuff is added, and the dyebath pH is adjusted. The solution is heated to a desired temperature of typically about from 95° C. to about 110° C. at a rate of from about 0.5° C. to about 3.0° C. per minute and is held at that temperature for about 30 minutes to about 60 minutes. The dyebath is cooled or emptied, and the articles are thoroughly rinsed with fresh water. The dyed articles are dried in a tumble drier or an oven, such as a tenter, or are passed over heater cans. The dyed articles may then be optionally heatset to improve dimensional stability.

Alternatively, fibers made from the light-stabilized polyamides of the present invention may be solution-dyed before being formed into articles. Usual conditions for solution-dyeing nylon may be employed. In one exemplary embodiment, the light-stabilized polyamide of the present invention is melted and colored with a colorant such as a pigment, a dye, any other colored compound, or a combination thereof. The colored light-stabilized polyamide is then spun into fibers or fabric according to conventional methods such as, for example, those disclosed in U.S. Pat. No. 4,983,448 to Karageorgiou, U.S. Pat. No. 5,487,860 to Kent et al., and U.S. Pat. No. 4,918,947 to Speich.

The present invention is further directed to a method of doing business, wherein the method comprises the step of offering for sale a light-stabilized polymer having a high concentration of light-stabilizing moieties covalently bonded along the polymer chain. The method of doing business may further comprise offering for sale one or more additional polymeric materials, wherein the one or more additional polymeric materials are substantially free from light-stabilizing moieties; and mixing the light-stabilized polymer having a high concentration of light-stabilizing moieties covalently bonded along the polymer chain with the one or more additional polymeric materials to from a polymer blend having a desired amount of light-stabilizing moieties along a polymer chain within the polymer blend.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following test methods were used to determine physical and chemical properties of the polymer articles produced in the examples that follow.

Test for Measuring End Group Content

The amino end group content was determined by dissolving about 2.0 grams of a polymer in about 60 cc of a phenol-methanol mixture (68:32 wt %) at 60° C. The solution was then titrated with about 0.20 N HCl at about 25° C. by a potentiometric method, wherein the endpoint was determined by a steep potential increase.

The carboxylic end group content was determined by dissolving about 0.30 grams of a polymer in about 40 cc of a mixture of benzyl alcohol at 180° C. The solution was then titrated with about 0.03 N t-butyl ammonium hydroxide at about 80° C. to about 100° C. by a potentiometric method, wherein the endpoint was determined by a steep potential increase.

Xenon Arc (Ultraviolet Light, "UV") Exposure

Knit tubes are exposed according to AATCC Test Method 16-1998, Option E: "Water-Cooled Xenon-Arc Lamp, Continuous Light" to 2125 kJ (500 hours) in 425 kJ (100 hour) increments. Following exposure, the tenacity of the samples is measured by the single strand method wherein single strand yarn specimens are broken at a constant rate of extension using an INSTRON™ tensile testing machine. Units are given in grams per denier (g/den.).

Ozone and $NO_x$ Exposure

Knit tubes are tested according to AATCC Test Method 129-1996, "Colorfastness to Ozone in the Atmosphere Under High Humidities" and AATCC Test Method 164-1992, "Colorfastness to oxides of Nitrogen in the Atmosphere Under High Humidities". Data in the form of total color difference ($\Delta E$) is collected at 1, 2, 3, 4, 6 and 8 cycles.

Total Color Difference ($\Delta E$)

Color measurements are made using Applied Color Systems (ACS) Spectrophotometer generating 1976 CIE LAB (D6500 illuminant, 10 degree observer) values. Delta E or $\Delta E$ (total color difference) calculations are made against unexposed controls. Details of CIE LAB measurements and calculation of total color difference ($\Delta E$) are found in the color science literature, for example, Billmeyer and Saltzman, Principles of Color Technology, 2nd Edition, J. Wiley & Sons, New York, (1981). Larger $\Delta E$ values indicate more color change and, therefore, more degradation in the colored fiber properties. CIE LAB color data is composed of measurements along three axes in three-dimensional space. L* is a quantification of lightness. Higher values are lighter. a* is the red-green axis with positive numbers being more red. b* is the yellow-blue axis with positive numbers being more yellow.

Strength Retention Test

The strength retention test used to determine yarn strength after exposure to ultraviolet (UV) light is described herein. Fabric samples were exposed to UV light as described in the AATCC TestMethod 16-1998, Option E described above. The strength of yarn raveled from the knit fabric prior to exposure, as well as, yarn raveled from the knit fabric after exposure to UV light was measured using an INSTRON™ machine, Model No. 4502. The strength retention was determined as shown below:

$$\text{Strength Retention (\%)} = \frac{\text{(Yarn Strength After UV Exposure)}}{\text{(Yarn Strength Prior to UV Exposure)}} \times 100$$

Example 1

Preparation of a Polyamide Containing No Light-Stabilizing Moieties

A nylon 6 polymer (RV 2.7) was formed in a polymerization reaction. The following reactants were charged into a 250-liter autoclave: 75 kg caprolactam, 1800 g water, and 112.5 g (0.15 weight percent) of propionic acid. The mixture was heated to about 270° C. in one hour, while the pressure increased to about 60 psi (3,102 mm Hg). After holding the mixture at about 60 psi (3,102 mm Hg) for about 30 minutes, the pressure was slowly released. To accelerate polymerization, the system was placed under a vacuum of about 9.67 psi (500 mm Hg) for the last 15 minutes. The polymer was then extruded under a positive nitrogen pressure and cut into chips. The chips were washed with hot water (about 90° C.) and dried in a tumble dryer. The amino end group content measured about 37 meq/kg, and the carboxylic end group content measured about 50 meq/kg.

Example 2

Preparation of a Polyamide Containing TAD Light-Stabilizing Moieties

A light-stabilized nylon 6 polymer was formed in a polymerization reaction. The following reactants were charged into a 250-liter autoclave: 75 kg caprolactam, 1800 g water, and 394 g (5.25 weight percent) of 4-amino-2,2,6,6-tetramethylpiperidine (TAD). The mixture was heated to about 270° C. in one hour, while the pressure increased to about 60 psi (3,102 mm Hg). After holding the mixture at about 60 psi (3,102 mm Hg) for about 30 minutes, the pressure was slowly released. To accelerate polymerization, the system was placed under a vacuum of about 8.70 psi (450 mm Hg) for about 90 minutes. The polymer was then extruded under a positive nitrogen pressure and cut into chips. The chips were washed with hot water (about 90° C.) and dried in a tumble dryer. The relative viscosity of the polymer was 1.46. The amino end group content was too high to measure, and the carboxylic end group content measured about 11 meq/kg.

Example 3

Preparation of a Polyamide Containing TAD Light-Stabilizing Moieties and Adipic Acid Chain Regulator A light-stabilized nylon 6 polymer was formed in a polymerization reaction. The following reactants were charged into a 250-liter autoclave: 50 kg caprolactam, 802 g water, 2.89 kg (5.25 weight percent) of 4-amino-2,2,6,6-tetramethylpiperidine (TAD), and 1.24 kg adipic acid (2.25 weight percent). The mixture was heated to about 270° C. in one hour, while the pressure increased to about 60 psi (3,102 mm Hg). After holding the mixture at about 60 psi (3,102 mm Hg) for about 30 minutes, the pressure was slowly released. To accelerate polymerization, the system was placed under a vacuum of about 8.70 psi (450 mm Hg) for about 90 minutes. The polymer was then extruded under a positive nitrogen pressure and cut into chips. The chips were washed with hot water (about 90° C.) and dried in a tumble dryer. The relative viscosity of the polymer was 1.46. The amino end group content was too high to measure, and the carboxylic end group content measured about 49 meq/kg.

Example 4

Preparation of a Polyamide Containing TAD Light-Stabilizing Moieties and Terephthalic Acid Chain Regulator A light-stabilized nylon 6 polymer was formed in a polymerization reaction. The following reactants were charged into a 250-liter autoclave: 50 kg caprolactam, 813 g water, 2.89 kg (5.25 weight percent) of 4-amino-2,2,6,6-tetramethylpiperidine (TAD), and 1.37 kg (2.5 weight percent) of terephthalic acid (TPA). The mixture was heated to about 270° C. in one hour, while the pressure increased to about 60 psi (3,102 mm Hg). After holding the mixture at about 60 psi (3,102 mm Hg) for about 30 minutes, the pressure was slowly released. To accelerate polymerization, the system was placed under a vacuum of about 8.70 psi (450 mm Hg) for about 90 minutes. The polymer was then extruded under a positive nitrogen pressure and cut into chips. The chips were washed with hot water (about 90° C.) and dried in a tumble dryer. The relative viscosity of the polymer was 1.48. The amino end group content was too high to measure, and the carboxylic end group content measured about 42 meq/kg.

Example 5

Preparation of Solution-Dyed Nylon Fibers from Polymer Blends

Nylon-6 host polymer (BS700F available from BASF Corporation, Mt. Olive, N.J.) was extruded at 260° C. to 265° C. along with Opal Gray color concentrate and an amount of light-stabilized polymer produced in Examples 2–4 above using a small-scale extruder. The above-mentioned components were fed to a spinning machine through volumetric feeders. The resulting filaments contained 0.15 weight percent TAD, based on the total weight of the polymer-forming components.

The extruded filaments were cooled and solidified by a stream of quench air at 15° C. After the application of a spin finish, the yarns were drawn at a draw ratio of 3.3 and textured in a texture jet at 215° C. The yarns were taken off at a draw roll speed of about 2350 m/min. The final yarns had a yarn construction of 1288 denier/58 filaments.

Example 6

Testing of Nylon Fibers

Knitted fabric samples were produced by knitting fabrics using the three types of yarns produced in Example 5. Fabrics were knitted on a knitting machine, Model 6-CK, manufactured by L-R Machine Sales, Inc. (Chickamauga, Ga.) using the following settings: 6 inch-diameter, and 90 needles. The strength retention of yarn samples removed from the fabric samples were measured after exposure to UV light according to AATCC 16E Test Method described above.

Knit tubes were tested for tenacity, strength retention, and colorfastness according to the test methods described above. The tenacity, strength retention, and colorfastness data is presented in Tables 1–3 below. As used in Tables 1–3 below, the designations "W" and "U" are used to describe "washed chips" and "unwashed chips" respectively.

TABLE 1

Tenacity Data of Yarns Formed From Polymer Blends
(Units - g/den.)

| Sample | LS Polymer | Addition Polymer | Orig. | 100 hrs | 200 hrs | 300 hrs | 400 hrs |
|---|---|---|---|---|---|---|---|
| 1 | — | BS700F | 2.9 | 2.7 | 2.5 | 1.9 | — |
| 2 | Ex. 2 | BS700F | 2.6 | 2.5 | 2.5 | 2.4 | 2.3 |
| 3 | Ex. 3 | BS700F | 2.7 | 2.5 | 2.4 | 2.3 | 2.3 |
| 4 | Ex. 4W | BS700F | 2.7 | 2.6 | 2.5 | 2.4 | 2.2 |
| 5 | Ex. 4U | BS700F | 2.8 | 2.6 | 2.4 | 2.2 | 2.5 |

TABLE 2

Strength Retention Data of Yarns Formed From Polymer Blends

| Sample | LS Polymer | Addition Polymer | Orig. | 100 hrs | 200 hrs | 300 hrs | 400 hrs |
|---|---|---|---|---|---|---|---|
| 1 | — | BS700F | 100% | 94% | 86% | 66% | — |
| 2 | Ex. 2 | BS700F | 96% | 96% | 92% | 88% | 96% |
| 3 | Ex. 3 | BS700F | 93% | 89% | 85% | 85% | 93% |
| 4 | Ex. 4W | BS700F | 96% | 93% | 89% | 81% | 96% |
| 5 | Ex. 4U | BS700F | 93% | 86% | 79% | 89% | 93% |

TABLE 3

Colorfastness (ΔE) Data of Yarns Formed From Polymer Blends

| Sample | LS Polymer | Addition Polymer | Orig. | 100 hrs | 200 hrs | 300 hrs | 400 hrs |
|---|---|---|---|---|---|---|---|
| 1 | — | BS700F | — | — | — | — | — |
| 2 | Ex. 2 | BS700F | 2.00 | 2.27 | 2.42 | 2.53 | 2.00 |
| 3 | Ex. 3 | BS700F | 1.87 | 2.30 | 2.36 | 2.51 | 1.87 |
| 4 | Ex. 4W | BS700F | 1.87 | 2.23 | 2.44 | 2.48 | 1.87 |
| 5 | Ex. 4U | BS700F | 1.93 | 2.24 | 2.37 | 2.50 | 1.93 |

As indicated by the data in Tables 1–3, yarns made according to the present invention have improved photostability, as measured by yarn tenacity, and strength retention, when compared to the photostability of conventional polyamide yarns.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a thermoformable article comprising:

forming a light-stabilized polyamide polymer having from about 2.5 to about 15.0 weight percent of one or more light-stabilizing moieties covalently bonded along the polyamide polymer chain, wherein the weight of the one or more light-stabilizing moieties is based on a total weight of polymer-forming components;

blending the light-stabilized polyamide polymer with one or more additional polymers, which are substantially free of light-stabilizing moieties, to form a polymer blend; and shaping the polymer blend to form a light-stabilized polymer blend having a weight percent of one or more light-stabilizing moieties covalently bonded along one or more polyamide polymer chains of less than about 2.0 weight percent, based on the weight of the polymer blend.

2. The method of claim 1, wherein the light-stabilized polymer is formed from caprolactam monomers and 4-amino-2,2,6,6-tetramethylpiperidine; and the one or more additional polymers comprise polyamide having no light-stabilizing moieties covalently bonded along the polyamide chain.

3. The method of claim 2, wherein the weight percent of 4-amino-2,2,6,6-tetramethylpiperidine moieties covalently bonded along one or more polymer chains is from about 0.08 to about 0.40 weight percent, based on the weight of the polymer blend.

4. The method of claim 3, wherein the weight percent of 4-amino-2,2,6,6-tetramethylpiperidine moieties covalently bonded along one or more polymer chains is from about 0.10 to about 0.30 weight percent, based on the weight of the polymer blend.

5. The method of claim 3, wherein the weight percent of 4-amino-2,2,6,6-tetramethylpiperidine moieties covalently bonded along one or more polymer chains is about 0.15 weight percent, based on the weight of the polymer blend.

6. The method of claim 1, wherein the shaping step is an extrusion step.

7. A fiber formed from the method of claim 6.

8. A method of making a thermoformable article comprising:

forming at least one of a light-stabilized polyamide polymer, a light-stabilized polyester polymer, a light-stabilized polyurethane polymer, or a light-stabilized polyimide polymer, each of said polymers having from about 2.5 to about 15.0 weight percent of one or more light-stabilizing moieties covalently bonded along the polymer chain, wherein the weight of the one or more light-stabilizing moieties is based on a total weight of polymer-forming components;

blending the light-stabilized polymer with one or more additional polymers, which are substantially free of light-stabilizing moieties, to form a polymer blend; and shaping the polymer blend to form a light-stabilized polymer blend having a weight percent of one or more light-stabilizing moieties covalently bonded along one or more polymer chains of less than about 2.0 weight percent, based on the weight of the polymer blend.

9. The method of claim 8, wherein the light-stabilized polymer is formed from caprolactam monomers and 4-amino-2,2,6,6-tetramethylpiperidine; and the one or more additional polymers comprise polyamide having no light-stabilizing moieties covalently bonded along the polyamide chain.

10. The method of claim 9, wherein the weight percent of 4-amino-2,2,6,6-tetramethylpiperidine moieties covalently bonded along one or more polymer chains is from about 0.08 to about 0.40 weight percent, based on the weight of the polymer blend.

11. The method of claim 10, wherein the weight percent of 4-amino-2,2,6,6-tetramethylpiperidine moieties covalently bonded along one or more polymer chains is from about 0.10 to about 0.30 weight percent, based on the weight of the polymer blend.

12. The method of claim 10, wherein the weight percent of 4-amino-2,2,6,6-tetramethylpiperidine moieties covalently bonded along one or more polymer chains is about 0.15 weight percent, based on the weight of the polymer blend.

13. The method of claim 8, wherein the shaping step is an extrusion step.

14. A fiber formed from the method of claim 13.

* * * * *